(12) United States Patent
Moser et al.

(10) Patent No.: US 7,624,827 B2
(45) Date of Patent: Dec. 1, 2009

(54) DRIVE UNIT FOR AN INSPECTION VEHICLE AND ALSO INSPECTION VEHICLE WITH SUCH A DRIVE UNIT

(75) Inventors: Roland Moser, Zurich (CH); Bernhard Mark, Waldshut-Tiengen (DE); Reto Kaufmann, Baden (CH); Josef Erni, Winterthur (CH)

(73) Assignee: ALSTOM Technology Ltd., Baden (CH)

( * ) Notice: Subject to any disclaimer, the term of this patent is extended or adjusted under 35 U.S.C. 154(b) by 0 days.

(21) Appl. No.: 12/136,103

(22) Filed: Jun. 10, 2008

(65) Prior Publication Data

US 2008/0308324 A1 Dec. 18, 2008

(30) Foreign Application Priority Data

Jun. 14, 2007 (CH) .................................. 0949/07

(51) Int. Cl.
*B62D 55/265* (2006.01)
*B62D 55/14* (2006.01)

(52) U.S. Cl. ..................... 180/9.32; 180/9.42; 180/901; 305/132; 305/136; 305/137

(58) Field of Classification Search ................ 180/9.32, 180/9.42, 901, 164; 104/138.2, 139, 281, 104/282, 283

See application file for complete search history.

(56) References Cited

U.S. PATENT DOCUMENTS

| | | | | | |
|---|---|---|---|---|---|
| 2,596,322 | A | * | 5/1952 | Zumwalt | ..................... 33/21.1 |
| 2,694,164 | A | * | 11/1954 | Geppelt | ..................... 335/296 |
| 3,147,143 | A | * | 9/1964 | Kiyoshi et al. | ............. 118/305 |
| 3,163,596 | A | * | 12/1964 | Ferris et al. | ................. 209/219 |
| 3,742,852 | A | * | 7/1973 | Leffler et al. | ................ 101/378 |
| 3,777,834 | A | * | 12/1973 | Hiraoka et al. | ............. 180/9.44 |
| 3,960,229 | A | * | 6/1976 | Shio | .......................... 180/9.62 |
| 5,252,927 | A | | 10/1993 | Bruhlmeier et al. | |
| 5,635,780 | A | * | 6/1997 | Kohlert et al. | ............ 310/68 R |
| 5,650,579 | A | | 7/1997 | Hatley et al. | |
| 5,853,655 | A | * | 12/1998 | Baker | .......................... 266/44 |
| 5,894,901 | A | * | 4/1999 | Awamura et al. | .......... 180/9.54 |
| 6,886,651 | B1 | * | 5/2005 | Slocum et al. | .............. 180/167 |
| 6,889,783 | B1 | * | 5/2005 | Moore et al. | ............... 180/9.21 |

(Continued)

FOREIGN PATENT DOCUMENTS

DE 2023683 12/1970

(Continued)

OTHER PUBLICATIONS

Search Report for Swiss Patent App. No. CH 0949/2007 (Sep. 5, 2007).

(Continued)

*Primary Examiner*—Lesley D. Morris
*Assistant Examiner*—Wesley Potter
(74) *Attorney, Agent, or Firm*—Cermak Kenealy Vaidya & Nakajima LLP; Adam J. Cermak

(57) ABSTRACT

A drive unit (10) for an inspection vehicle which can be used on ferromagnetic bases (19), especially in generators, which drive unit includes a motor-powered crawler track (18) and also magnetic devices for holding the drive unit (10) on the base (19). An improved insensitivity to uneven spots in the base is achieved by the crawler track (18), in the region where it bears upon the base (19), being guided via inner, spring-mounted running wheels (12), and by the magnetic devices being integrated in the running wheels (12).

15 Claims, 4 Drawing Sheets

U.S. PATENT DOCUMENTS

2002/0104693 A1 * 8/2002 Moore et al. .................. 180/9.1

FOREIGN PATENT DOCUMENTS

| EP | 1772949 | | 4/2007 |
| FR | 2689479 | A1 * | 10/1993 |
| GB | 989742 | | 4/1965 |
| GB | 2187689 | A * | 9/1987 |
| JP | 60001083 | | 1/1985 |
| JP | 07323701 | | 12/1995 |
| JP | 10016504 | | 1/1998 |
| WO | WO 2007104082 | A1 * | 9/2007 |

OTHER PUBLICATIONS

Search Report for European Patent App. No. 08104264.0 (Jul. 4, 2008).

* cited by examiner

DRIVE UNIT FOR AN INSPECTION VEHICLE AND ALSO INSPECTION VEHICLE WITH SUCH A DRIVE UNIT

This application claims priority under 35 U.S.C. § 119 to Swiss application no. 00949/07, filed 14 Jun. 2007, the entirety of which is incorporated by reference herein.

BACKGROUND OF THE INVENTION

1. Field of Endeavor

The present invention relates to the field of maintenance and checking of technical installations, especially in power generating plants. It relates to a drive unit for an inspection vehicle, and also to an inspection vehicle with such a drive unit.

2. Brief Description of the Related Art

Units of power generating plants, such as generators, boilers or suchlike, must be inspected and tested for their condition within the scope of the maintenance in order to reveal, and possibly to remedy, possible weak spots or defects. Such an inspection frequently necessitates access to closed-off or inaccessible areas and repeated measuring processes along the structure which is to be checked. An example of such inspections is the checking on the inner side of the rotor of a generator. For this purpose, a robot system is required, which is small enough to reach the corresponding areas and which can cover defined measuring distances.

An inspection crawler for the inspection of generators, which can be inserted in the air gap between rotor and stator, is known from U.S. Pat. No. 5,650,579. The inspection crawler includes three drive units which are equipped with driven crawler tracks and which, in a relatively spread apart manner, can be moved transversely to the direction of travel in order to fix the vehicle in the air gap. The use of this device, however, is limited to air gaps of generators.

A device for monitoring corona discharges in dynamoelectric machines is known from U.S. Pat. No. 5,252,927, in which a vehicle which is equipped with dedicated drive units is used. The actual monitoring apparatus is arranged between two drive units which are provided with crawler tracks and which have a motor-powered drive in each case. Permanent magnets, which interact with the iron of the stator core stack and press the device onto the surface which is to be covered, are arranged in a fixed manner in each case at the two ends of the drive units. With this known device, it is disadvantageous that on uneven surfaces the permanent magnets can partially lose their attracting action and the device can then fall off (especially during overhead operation). Known generator stators, for example, are sealed with a resin which is prone to drip formation on the edges of the stator core stack. Such hard-set drips, which are about 5 mm high, can represent an insurmountable obstacle for such a known device with magnetic adhesion. In practice, however, it is also disadvantageous that in each of the drive units two parallel crawler tracks are used, between which the permanent magnets are arranged. Therefore, it is the drive units in particular which cause problems in the case of the known device.

SUMMARY

One of numerous aspects of the present invention involves a drive unit for an inspection vehicle, especially for the field of power generating plants, which can avoid disadvantages of known drive units and is especially characterized by a secure adhesion on the surface which is to be inspected, even with larger uneven spots.

Another aspect includes that the crawler track, in the region where it bears upon the base, is guided via inner, spring-mounted running wheels, and that the magnetic elements are integrated in the running wheels.

In particular, the drive unit includes a support structure, upon which the running wheels are spring-mounted.

A development of the invention is characterized in that the running wheels have a wheel axis in each case, and that the magnetic means include two magnetic rings which are axially spaced apart from one another and arranged concentrically to the wheel axis, wherein the magnetic rings are preferably formed as permanent magnets.

According to another development, the magnetic rings are held a distance apart by an inner ring which is arranged between them, a central and raised wheel guide, which extends in the longitudinal direction, is provided on the inner side of the crawler track, and the magnetic rings with the inner ring, which lies between them, form an encompassing groove which in width and depth is matched to the wheel guide.

The magnetic rings in this case can mutually repel, wherein the inner ring is formed of a non-magnetic material.

The magnetic rings, however, can also mutually attract, wherein the inner ring is formed of a non-magnetic material or is also formed as a magnetic ring.

For the magnetic action of the running wheels, in all cases it is advantageous if ferromagnetic outer rings abut, in each case, against the magnetic rings on the outside.

The individual rings of the running wheel are preferably arranged on a common support ring.

The crawler track in this case includes a rubber track or a comparable flexible track.

An inspection vehicle embodying principles of the present invention, with at least two drive units which are arranged in parallel and spaced apart from one another, between which a sensor platform is arranged, can include two drive units.

A development of an inspection vehicle according to principles of the present invention includes that, for using the vehicle on bases with a cylinder shell-shaped surface of varying diameter, the drive units and the central sensor platform are interconnected via swivel joints.

Another development of an inspection vehicle according to principles of the present invention includes that, for using the vehicle on bases with a cylinder shell-shaped surface of fixed diameter, the drive units and the central sensor platform are interconnected via corresponding tube bends.

BRIEF DESCRIPTION OF THE DRAWINGS

The invention is to be subsequently explained in more detail based on exemplary embodiments in conjunction with the drawing. In the drawing.

DETAILED DESCRIPTION OF EXEMPLARY EMBODIMENTS

Figure 1:
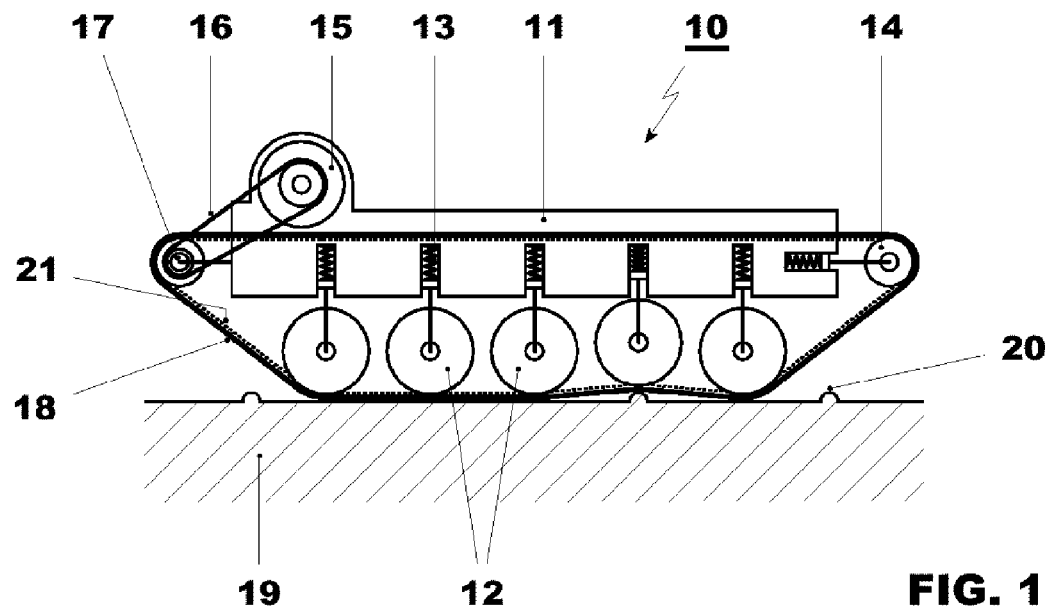
FIG. 1 shows in a simplified side view a drive unit according to a preferred exemplary embodiment of the invention.

In FIG. 1, a drive unit according to a preferred exemplary embodiment of the invention is displayed in a simplified representation in side view. The drive unit 10 includes a support structure 11, on the underside of which a multiplicity (in the example 5) of running wheels 12 are spring-mounted by individual springs 13. The running wheels 12 run on a separate, closed flexible crawler track 18, which can be formed as a (magnetically permeable) rubber track or as a plastic track. The crawler track 18 is guided at one end of the drive unit 10 over a deflection roller 14 which is loaded by a spring and serves as a track tensioner. At the other end of the drive unit 10, the crawler track 18 is guided over a drive sprocket 17 which is driven via a drive belt 16 by a drive motor 15 which is arranged on the upper side of the support structure 11.

The driving track 18 is provided on the inner side with a wheel guide 21, in the form of a raised toothed belt strip (see also FIG. 3), which is arranged in the middle of the track and engages in the encompassing groove on the running wheels 12. The drive sprocket 17 is formed as a toothed wheel which meshes with the toothed belt of the wheel guide 21.

Because of the spring mounting of the running rollers 12, the effect is achieved of the crawler track 18 being able to be optimally adapted to local uneven spots 20 which are present on the base 19 which is to be covered in the course of an inspection. At the same time, as a result of an integration of magnetically acting adhesion in the running wheels 12, it is ensured that, despite possible uneven spots 20, the adhesion of the drive unit upon or against the base 19, for example upon a boiler wall or a generator stator or suchlike, is optimally maintained.

Figures 3A, 3B, 3C:
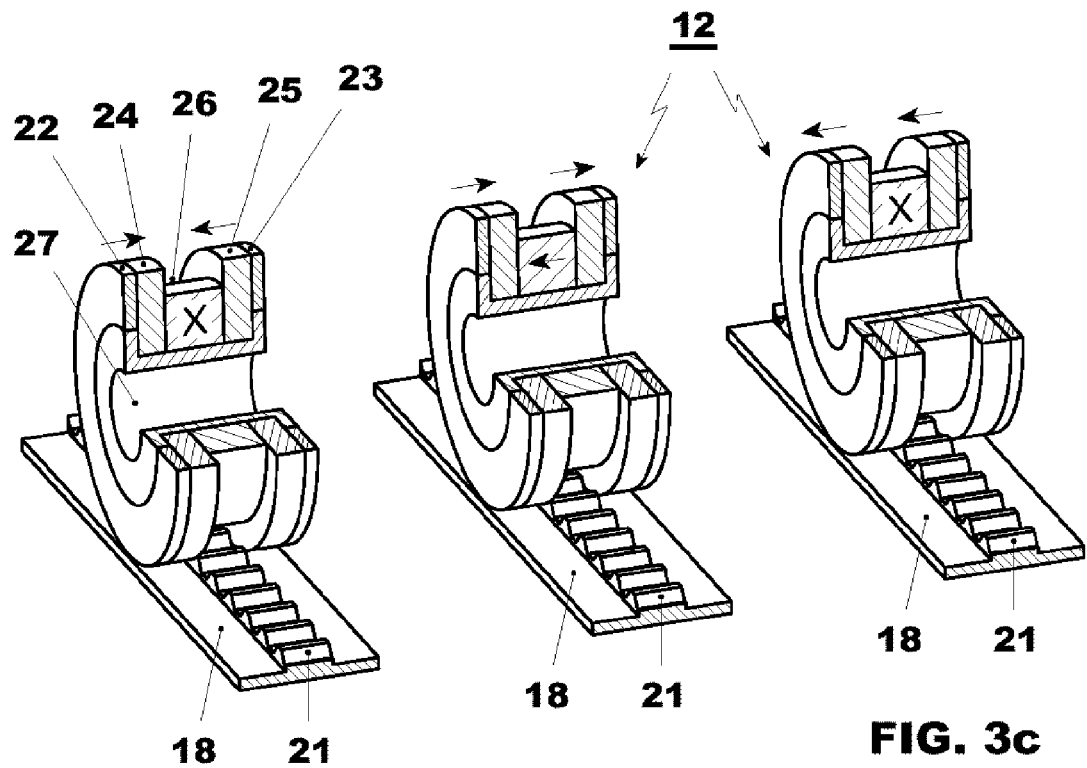
FIG. 3 shows, in three figure sections, three different variants, with regard to the magnetic structure, for the inner construction of the running wheels of the drive unit from FIG. 1.
Figure 4:
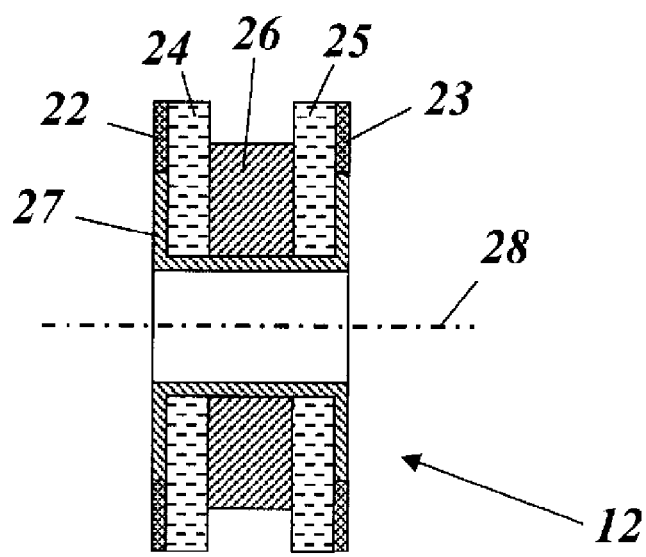
FIG. 4 shows the section through a running wheel according to FIG. 3.

The integration of the magnetic adhesion in the running wheels 12 according to FIGS. 3 and 4 can be carried out in different ways. It is common to all the variants which are represented in FIGS. 3a to 3c that the encompassing groove for accommodating the wheel guide 21 is formed by two magnetic rings 24, 25 of the same type which are spaced apart from one another, between which an inner ring 26, which is reduced in outside diameter, is arranged. The three rings 24, 25, 26, which are concentric to the wheel axis 28, are fastened on a central support ring 27 which supports the hub of the running wheel. On the outside, the magnetic rings 24, 25 abut in each case against ferromagnetic outer rings 22, 23 which are also seated upon the support ring 27.

The magnetic rings 24, 25 are preferably formed as permanent magnets. In one variant (FIG. 3a), the magnetic rings 24, 25 are poled so that they mutually repel (symbolized by opposed field direction arrows in FIG. 3a). The inner ring 26 in this case is formed of a non-magnetic material, for example aluminum (symbolized by "x" in FIG. 3a).

In the two other variants of FIGS. 3b and 3c, the magnetic rings 24, 25 mutually attract (symbolized by field direction arrows in the same direction). The inner ring 26 in this case can be formed either of a non-magnetic material such as aluminum (FIG. 3c), or can also be formed as a magnetic ring (FIG. 3b).

In all cases, the integration of the magnetic device in the running wheels 12 ensures that even with uneven spots 20 in the (customarily ferromagnetic) base 19 the attracting forces are distributed, and always in sufficient magnitude, in order to safely prevent raising or falling of the drive unit 10 from the base 19.

Figure 2:
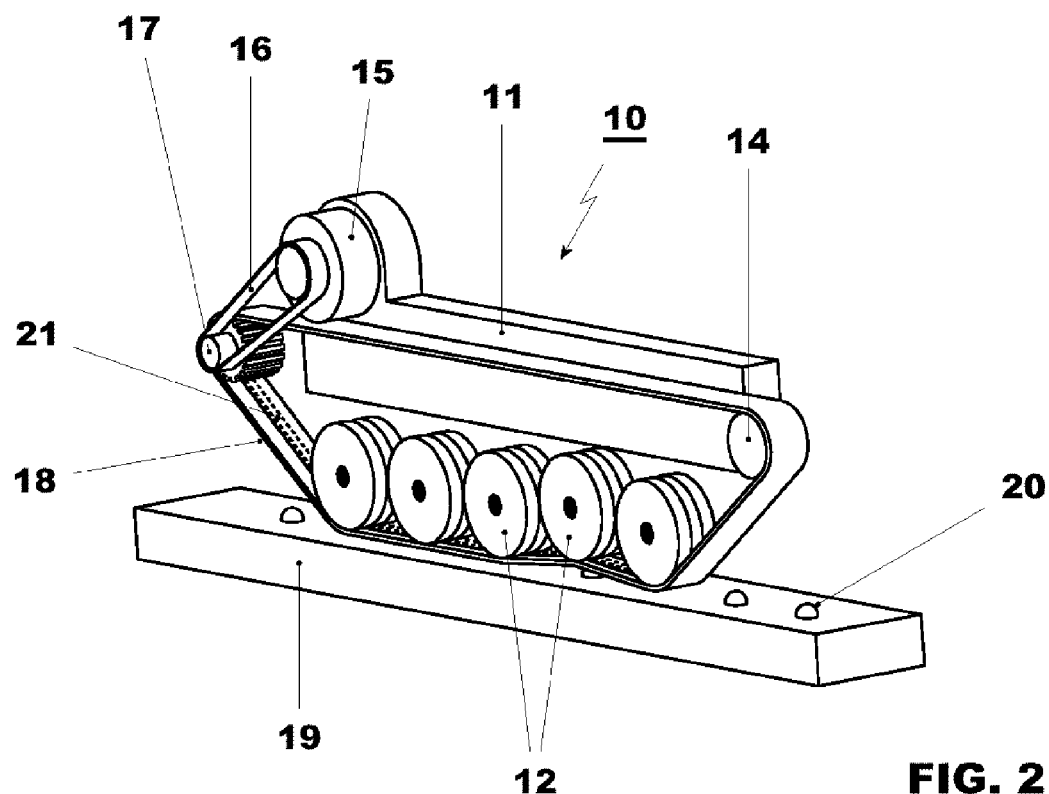
FIG. 2 shows the exemplary embodiment of FIG. 1 in a perspective side view.
Figure 5:
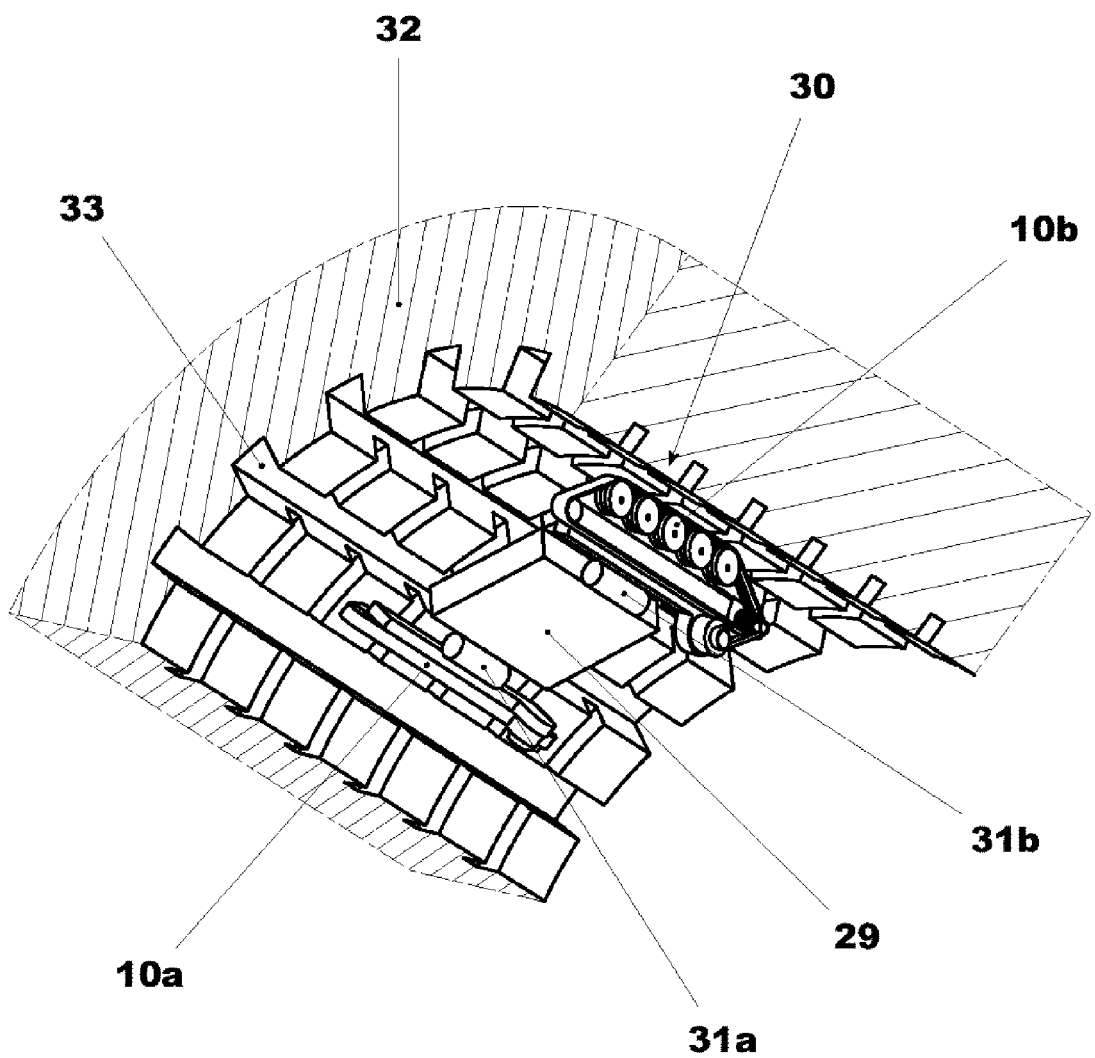
FIG. 5 shows the use of an inspection vehicle according to an exemplary embodiment of the invention on the inner surface of a generator stator, wherein the vehicle is adaptable to different inner radii by swivel joints.

In order to now cover, for example, the cylindrical inner wall of a generator stator in a direction along the machine axis, according to FIG. 5 two drive units 10a, 10b, which are shown in FIGS. 1 and 2, are combined with a sensor platform 29, which is arranged between them, forming an inspection vehicle which, being fixed by magnetic force on the inner wall of the stator 32, travels along the inner wall in an axial direction and checks the characteristics of the stator 32. The drive units 10a, 10b in this case run on the sections of the inner wall which lie between the grooves 33. If the two drive units 10a, 10b, which lie on the outside, and the sensor platform 29, which lies on the inside, are connected to the checking apparatuses, which are mounted thereupon, by swivel joints 31a and 31b, which are pivotable around axial swivel axes, the inspection vehicle 30 can be adapted to surfaces which are curved to different degrees. Naturally, the covering of flat surfaces is also possible.

Figure 6:
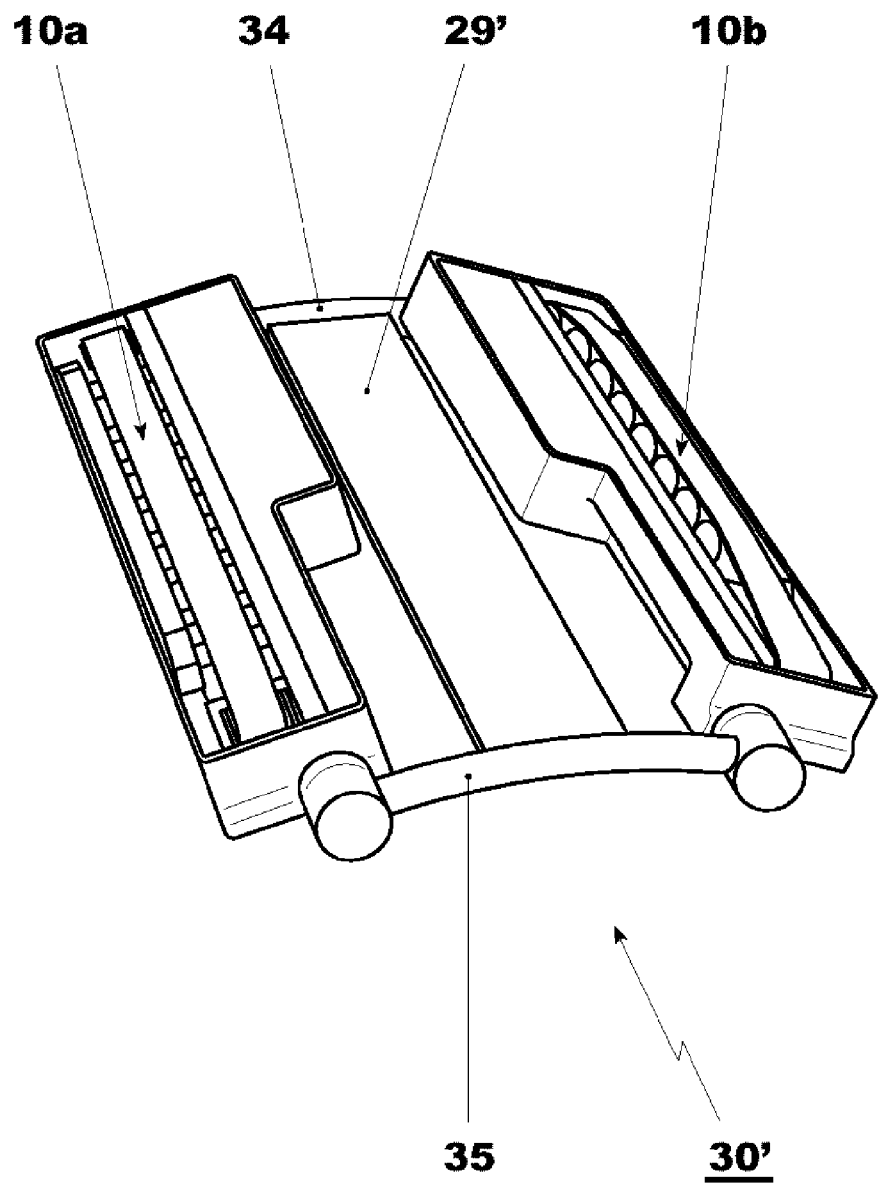
FIG. 6 shows a photographic representation of another exemplary embodiment of an inspection vehicle according to the invention, for a fixed inner radius.

However, it is also conceivable, with a simplified construction, to design the inspection vehicle for fixed curvatures or radii. The photographic record of FIG. 6 shows such an exemplary embodiment. With the inspection vehicle 30' depicted there, two drive units 10a, 10b of the type which is schematically shown in FIG. 1 are detachably connected by two tube bends 34, 35, which are arranged at the ends of the vehicle, to the sensor platform 29' which is arranged between the drive units. The tube bends 34, 35 in this case preset a fixed radius of the surface or base which is to be checked, but can easily be exchanged for tube bends with another curvature. The motor-powered drive is affected by axially arranged motors via bevel gears.

The inspection vehicle 30' according to FIG. 6 can be used to carry out inspections and measurements on a generator stator if the rotor is removed. In doing so, especially uneven spots in the surface which is to be covered can be easily passed over without detriment. However, other components can also be inspected, such as rotor wedges of generators or other large ferromagnetic structures in a power generating plant.

Vehicles according to the invention can be optimum for quick inspections and measurements, can easily be adapted to different geometric features, and can be assembled easily and without an additional tool. The low weight and the high mechanical stability make it especially suitable for field operations in all parts of the world.

| List of designations | |
|---|---|
| 10, 10a, b | Drive unit |
| 11 | Support structure |
| 12 | Running wheel (magnetic) |
| 13 | Spring mounting |
| 14 | Deflection roller (track tensioner) |
| 15 | Drive motor |
| 16 | Drive belt |
| 17 | Drive sprocket |
| 18 | Crawler track (rubber track) |
| 19 | Base |
| 20 | Uneven spot |
| 21 | Wheel guide |
| 22, 23 | Outer ring (ferromagnetic) |
| 24, 25 | Magnetic ring (permanent magnet) |
| 26 | Inner ring |
| 27 | Support ring |
| 28 | Wheel axis (running wheel) |
| 29, 29' | Sensor platform |

-continued

List of designations

| 30, 30' | Inspection vehicle |
| 31a, b | Swivel joint |
| 32 | Stator |
| 33 | Groove |
| 34, 35 | Tube bend |

While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A drive unit for an inspection vehicle which can be used on ferromagnetic bases, the drive unit comprising:
 a motor-powered crawler track;
 a magnetic device configured and arranged to hold the drive unit on a base;
 inner, spring-mounted running wheels, the crawler track being guided by the running wheels in the region where the track will bear upon the base; and
 wherein the magnetic device is integrated in the running wheels.

2. The drive unit as claimed in claim 1, further comprising a support structure upon which the running wheels are spring-mounted.

3. The drive unit as claimed in claim 1, wherein each of said running wheels has a wheel axis, and wherein the magnetic device comprises two magnetic rings which are spaced apart from one another along and arranged concentrically to the wheel axis.

4. The drive unit as claimed in claim 3, wherein the magnetic rings comprise permanent magnets.

5. The drive unit as claimed in claim 3, further comprising:
 an inner ring positioned between and spacing apart the magnetic rings.

6. The drive unit as claimed in claim 5, further comprising:
 a central and raised wheel guide which extends in the longitudinal direction on the inner side of the crawler track and
 wherein the magnetic rings and the inner ring together form an encompassing groove having a width and a depth matched to the wheel guide.

7. The drive unit as claimed in claim 3, wherein the magnetic rings mutually repel, and wherein the inner ring is formed of a non-magnetic material.

8. The drive unit as claimed in claim 3, wherein the magnetic rings mutually attract, and wherein the inner ring is formed of a non-magnetic material.

9. The drive unit as claimed in claim 3, wherein the magnetic rings mutually attract, and wherein the inner ring comprises a magnetic ring.

10. The drive unit as claimed in claim 3, further comprising:
 ferromagnetic outer rings positioned to abut each magnetic ring on the outside.

11. The drive unit as claimed in claim 3, further comprising:
 a common support ring on which the individual rings are positioned.

12. The drive unit as claimed in claim 1, wherein the crawler track comprises a rubber track or a flexible track.

13. An inspection vehicle comprising:
 a sensor platform;
 at least two drive units arranged in parallel and spaced apart from one another on opposite lateral sides of the sensor platform;
 wherein each of the two drive units comprises a drive unit as claimed in claim 1.

14. The inspection vehicle as claimed in claim 13, further comprising:
 swivel joints connecting together the at least two drive units with the central sensor platform, configured and arranged to permit using the vehicle on bases with a cylinder shell-shaped surface of varying diameter.

15. The inspection vehicle as claimed in claim 13, further comprising:
 tube bends connecting together the at least two drive units with the central sensor platform, configured and arranged to permit using the vehicle on bases with a cylinder shell-shaped surface of fixed diameter.

* * * * *